United States Patent Office.

SAMUEL J. MILLER, OF ECONOMY, INDIANA.

Letters Patent No. 96,943, dated November 16, 1869.

IMPROVED MEDICAL COMPOUND FROM OAK-BARK.

The Schedule referred to in these Letters Patent and making part of the same.

*To all whom it may concern:*

Be it known that I, SAMUEL J. MILLER, of Economy, in the county of Wayne, and State of Indiana, have invented a new and valuable Improvement in Medical Compounds; and I do hereby declare that the following is a full, clear, and exact description of the same.

My invention relates to medical compounds; and

It consists, mainly, in compounding together and preparing for use oak-bark and lime, in such manner as to form a novel and useful remedy for piles, scalds, burns, and many other afflictions, to which mankind is subject.

My remedy is compounded in the manner following, that is to say:

I take oak-bark, and extract its astringent properties, by boiling in water, until a tolerably strong solution is formed thereof. I next make a tolerably strong solution of lime, and mix the two liquids together, in the proportion of five parts of the oak-bark tea to one part of the lime-water.

I then evaporate the compound by boiling, until a thick paste is formed thereof, when I place it upon pans and dry it. Care must be taken to filter the liquid properly before it is evaporated.

In the absence of lime, alkali may be used as a substitute, but I consider lime preferable.

The medicine above described may be prepared as an ointment, and used successfully in healing, not only piles, but various kinds of cutaneous diseases, as well as scalds and burns.

What I claim as my invention, and desire to secure by Letters Patent, is—

The medical compound herein described, compounded of the materials and in the manner substantially as specified.

In testimony that I claim the above, I have hereunto subscribed my name, in the presence of two witnesses.

SAMUEL J. MILLER.

Witnesses:
 WM. SWAIN,
 EDWIN DENNIS.